(12) United States Patent
Cronk et al.

(10) Patent No.: US 8,096,671 B1
(45) Date of Patent: Jan. 17, 2012

(54) LIGHT EMITTING DIODE ILLUMINATION SYSTEM

(75) Inventors: Michael Kent Cronk, Portland, OR (US); Owen Boyd Stephens, Beaverton, OR (US)

(73) Assignee: NMERA, LLC, Portland, OR (US)

( * ) Notice: Subject to any disclaimer, the term of this patent is extended or adjusted under 35 U.S.C. 154(b) by 352 days.

(21) Appl. No.: 12/384,491

(22) Filed: Apr. 6, 2009

(51) Int. Cl.
F21S 8/00 (2006.01)
F21V 7/04 (2006.01)

(52) U.S. Cl. ..... 362/147; 362/602; 362/276; 362/249.02

(58) Field of Classification Search .......... 362/602–605, 362/147, 148, 249.02, 276, 612, 613, 364–367, 362/800
See application file for complete search history.

(56) References Cited

U.S. PATENT DOCUMENTS

| | | | |
|---|---|---|---|
| 4,044,708 A | 8/1977 | Klein | |
| 4,582,406 A | 4/1986 | Wally | |
| 4,884,860 A | 12/1989 | Brown | |
| 4,907,132 A | 3/1990 | Parker | |
| 5,040,878 A | 8/1991 | Eichenlaub | |
| D325,096 S | 3/1992 | Peshak | |
| 5,101,142 A | 3/1992 | Chatfield | |
| 5,189,339 A | 2/1993 | Peshak | |
| 5,497,306 A | 3/1996 | Pastrick | |
| 5,539,623 A | 7/1996 | Gurz et al. | |
| 5,613,751 A | 3/1997 | Parker et al. | |
| 5,823,654 A | 10/1998 | Pastrick et al. | |
| 6,149,287 A | 11/2000 | Pastrick et al. | |
| 6,181,490 B1 | 1/2001 | Wun et al. | |
| 6,200,002 B1 | 3/2001 | Marshall et al. | |
| 6,222,623 B1 | 4/2001 | Wetherell | |
| 6,256,151 B1 | 7/2001 | Ma et al. | |
| 6,299,333 B1 | 10/2001 | Pastrick et al. | |
| 6,330,111 B1 | 12/2001 | Myers | |
| 6,447,132 B1 | 9/2002 | Harter, Jr. | |
| 6,473,554 B1 | 10/2002 | Pelka et al. | |
| 6,480,307 B1 | 11/2002 | Yang | |
| 6,494,602 B2 | 12/2002 | Pastrick et al. | |
| 6,511,182 B1 | 1/2003 | Agostinelli et al. | |
| 6,547,416 B2 | 4/2003 | Pashley et al. | |
| 6,582,103 B1 | 6/2003 | Popovich et al. | |
| 6,590,174 B2 | 7/2003 | Zysnarski et al. | |
| 6,709,136 B2 | 3/2004 | Pastrick et al. | |
| 6,759,965 B1 | 7/2004 | Hatjasalo et al. | |
| 6,773,126 B1 | 8/2004 | Hatjasalo et al. | |
| 6,779,892 B2 | 8/2004 | Agostinelli et al. | |
| 6,829,089 B2 | 12/2004 | Agostinelli et al. | |
| 6,832,848 B2 | 12/2004 | Pastrick et al. | |
| 6,833,565 B2 | 12/2004 | Su et al. | |
| 6,870,176 B2 | 3/2005 | Rohrbacher et al. | |
| 6,874,922 B2 * | 4/2005 | Matsuura et al. | 362/497 |
| 6,903,809 B2 | 6/2005 | Donahue et al. | |

(Continued)

*Primary Examiner* — Bao Q Truong
(74) *Attorney, Agent, or Firm* — Marger Johnson & McCollom, P.C.

(57) ABSTRACT

An illumination panel has four peripheral edges constructed of an upper plate and a lower plate. Each of the plates has aligned peripheral edges and an upper and lower surface. The upper plate is fabricated of an optically reflective material. The lower plate is fabricated of an optically diffusive material. Each of the illumination panels includes a peripheral frame formed of four edge pieces. Each of the edge pieces is in a cross sectional configuration to receive and support the peripheral edges of the plates. A pair of opposed recesses face each other in the edge pieces. A printed circuit board with a plurality of light emitting diodes is supported in the edge pieces by the recesses. An electrical connector is adapted to disperse electrical power to the light emitting diodes.

1 Claim, 3 Drawing Sheets

U.S. PATENT DOCUMENTS

| | | |
|---|---|---|
| 6,945,684 B2 | 9/2005 | Chen et al. |
| 6,948,840 B2 | 9/2005 | Grenda et al. |
| 6,961,103 B2 | 11/2005 | Sung et al. |
| 6,964,489 B2 | 11/2005 | Blume et al. |
| 6,979,105 B2 | 12/2005 | Leysath |
| 6,997,584 B1 | 2/2006 | Rothan et al. |
| 7,007,417 B2 | 3/2006 | Segan et al. |
| 7,012,542 B2 | 3/2006 | Powell et al. |
| 7,057,814 B2 | 6/2006 | Boyd et al. |
| 7,063,440 B2 | 6/2006 | Mohacsi et al. |
| 7,072,096 B2 | 7/2006 | Holman et al. |
| 7,075,597 B2 | 7/2006 | Wen et al. |
| 7,152,988 B2 | 12/2006 | Hung |
| 7,163,319 B2 | 1/2007 | Kuo et al. |
| 7,163,572 B1 | 1/2007 | Liang et al. |
| 7,168,830 B2 | 1/2007 | Pastrick et al. |
| 7,170,480 B2 | 1/2007 | Boldt, Jr. et al. |
| 7,172,328 B2 | 2/2007 | Hoelen et al. |
| 7,182,480 B2 | 2/2007 | Kan |
| D538,491 S | 3/2007 | Pan |
| 7,193,248 B2 | 3/2007 | Weindorf et al. |
| 7,207,701 B2 | 4/2007 | Kennedy et al. |
| 7,210,817 B2 | 5/2007 | Lee et al. |
| 7,214,952 B2 | 5/2007 | Klipstein et al. |
| 7,218,824 B2 | 5/2007 | Franklin et al. |
| 7,220,021 B2 | 5/2007 | Wang et al. |
| 7,220,043 B2 | 5/2007 | Cha et al. |
| 7,223,008 B2 | 5/2007 | Henriet et al. |
| 7,223,009 B2 | 5/2007 | Henriet et al. |
| 7,223,270 B2 | 5/2007 | Altshuler et al. |
| 7,223,281 B2 | 5/2007 | Altshuler et al. |
| 7,234,834 B2 | 6/2007 | Lai et al. |
| 7,253,892 B2 | 8/2007 | Semersky et al. |
| 7,262,438 B2 | 8/2007 | Mok et al. |
| 7,273,308 B2 | 9/2007 | Spero et al. |
| 7,273,310 B2 | 9/2007 | Chen |
| 7,293,804 B2 | 11/2007 | Li et al. |
| 7,300,194 B2 | 11/2007 | Parker |
| 7,309,151 B2 | 12/2007 | Mok et al. |
| 7,320,531 B2 | 1/2008 | West et al. |
| 7,322,731 B2 | 1/2008 | Epstein et al. |
| 7,323,256 B2 | 1/2008 | Xu et al. |
| 7,323,830 B2 | 1/2008 | Adam et al. |
| 7,326,583 B2 | 2/2008 | Andrews et al. |
| 7,329,905 B2 | 2/2008 | Ibbetson et al. |
| 7,331,113 B1 | 2/2008 | Patrick et al. |
| 7,332,031 B2 | 2/2008 | Tischler et al. |
| 7,332,365 B2 | 2/2008 | Nakamura et al. |
| 7,335,920 B2 | 2/2008 | Denbaars et al. |
| 7,338,822 B2 | 3/2008 | Wu et al. |
| 7,341,175 B2 | 3/2008 | Slater, Jr. et al. |
| 7,342,220 B2 | 3/2008 | Chen et al. |
| 7,344,284 B2 | 3/2008 | Lynam et al. |
| D566,056 S | 4/2008 | Edmond et al. |
| D566,057 S | 4/2008 | Edmond et al. |
| 7,354,184 B2 | 4/2008 | Parker |
| 7,355,284 B2 | 4/2008 | Negley |
| 7,357,535 B2 | 4/2008 | Tsai et al. |
| 7,358,929 B2 | 4/2008 | Mueller et al. |
| 7,358,954 B2 | 4/2008 | Negley et al. |
| 7,365,371 B2 | 4/2008 | Andrews |
| 7,369,316 B2 | 5/2008 | Shanley et al. |
| 7,374,325 B2 | 5/2008 | Ko |
| 7,382,427 B2 | 6/2008 | Choi |
| 7,384,074 B2 | 6/2008 | He |
| 7,384,177 B2 | 6/2008 | Parker |
| 7,384,809 B2 | 6/2008 | Donofrio |
| 7,385,574 B1 | 6/2008 | Van de Ven et al. |
| 7,394,512 B2 | 7/2008 | Choi |
| 7,402,837 B2 | 7/2008 | Slater, Jr. et al. |
| 7,404,659 B2 | 7/2008 | Mai |
| 7,405,093 B2 | 7/2008 | Andrews |
| 7,407,307 B2 * | 8/2008 | Hiratsuka .................. 362/304 |
| 7,413,321 B2 | 8/2008 | Kim |
| 7,418,769 B2 | 9/2008 | Zhang |
| 7,420,222 B2 | 9/2008 | Slater, Jr. et al. |
| 7,425,729 B2 | 9/2008 | Yun et al. |
| D578,971 S | 10/2008 | Yun et al. |
| 7,434,974 B2 | 10/2008 | Parker |
| 7,442,564 B2 | 10/2008 | Andrews |
| 7,446,345 B2 | 11/2008 | Emerson et al. |
| D582,865 S | 12/2008 | Edmond et al. |
| D582,866 S | 12/2008 | Edmond et al. |
| D583,338 S | 12/2008 | Edmond et al. |
| 7,458,698 B2 | 12/2008 | Heathcock et al. |
| 7,462,861 B2 | 12/2008 | Slater, Jr. et al. |
| 7,473,938 B2 | 1/2009 | Edmond et al. |
| 7,547,112 B2 * | 6/2009 | Kim ........................ 362/148 |
| 7,766,536 B2 * | 8/2010 | Peifer et al. .............. 362/633 |
| 2004/0264161 A1 | 12/2004 | Wu |
| 2006/0061681 A1 | 3/2006 | Wei et al. |
| 2006/0219882 A1 | 10/2006 | Chen |
| 2006/0220378 A1 | 10/2006 | Li et al. |
| 2006/0221193 A1 | 10/2006 | Zhang |
| 2006/0233542 A1 | 10/2006 | Chen |
| 2007/0046626 A1 | 3/2007 | Cheng |
| 2007/0103599 A1 | 5/2007 | Wen-Chin |
| 2007/0133193 A1 * | 6/2007 | Kim ........................ 362/147 |
| 2007/0171386 A1 | 7/2007 | Cheng et al. |
| 2007/0223219 A1 | 9/2007 | Medendorp et al. |
| 2007/0256340 A1 | 11/2007 | Kim |
| 2007/0258263 A1 | 11/2007 | Kim |
| 2007/0262339 A1 | 11/2007 | Hussell et al. |
| 2007/0274667 A1 | 11/2007 | Loh et al. |
| 2007/0297179 A1 | 12/2007 | Leung et al. |
| 2008/0001160 A1 | 1/2008 | Andrews |
| 2008/0018830 A1 | 1/2008 | Negley |
| 2008/0038858 A1 | 2/2008 | Emerson et al. |
| 2008/0054286 A1 | 3/2008 | Loh et al. |
| 2008/0061311 A1 | 3/2008 | Denbaars et al. |
| 2008/0067809 A1 | 3/2008 | He |
| 2008/0079017 A1 | 4/2008 | Loh et al. |
| 2008/0130275 A1 | 6/2008 | Higley et al. |
| 2008/0135866 A1 | 6/2008 | Donofrio |
| 2008/0142829 A1 | 6/2008 | Negley |
| 2008/0170396 A1 | 7/2008 | Yuan et al. |
| 2008/0170398 A1 | 7/2008 | Kim |
| 2008/0173884 A1 | 7/2008 | Chitnis et al. |
| 2008/0179611 A1 | 7/2008 | Chitnis et al. |
| 2008/0185608 A1 | 8/2008 | Chitnis |
| 2008/0191237 A1 | 8/2008 | Andrews |
| 2008/0224597 A1 | 9/2008 | Baretz et al. |
| 2008/0224598 A1 | 9/2008 | Baretz et al. |
| 2008/0232093 A1 | 9/2008 | Kim |
| 2008/0232116 A1 | 9/2008 | Kim |
| 2008/0252229 A1 | 10/2008 | Wu |
| 2008/0258628 A1 | 10/2008 | Higley et al. |
| 2008/0266842 A1 * | 10/2008 | Skidmore et al. ............ 362/147 |
| 2008/0266843 A1 * | 10/2008 | Villard ..................... 362/147 |
| 2008/0283861 A1 | 11/2008 | Loh et al. |

* cited by examiner

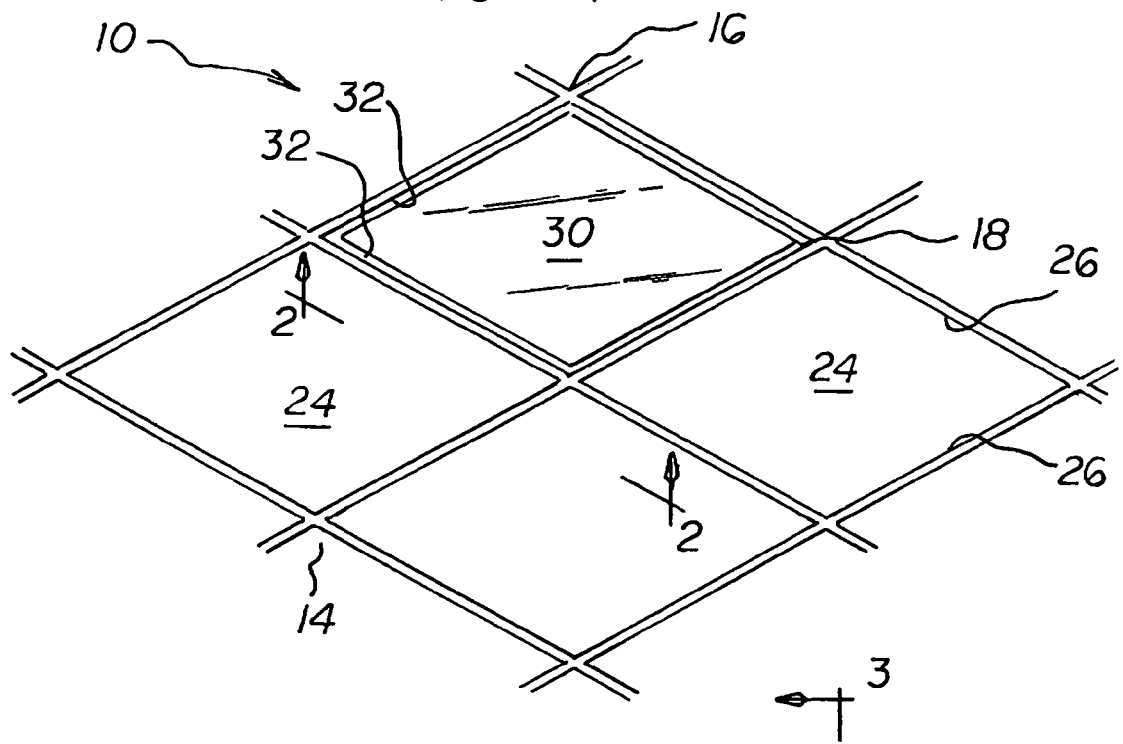
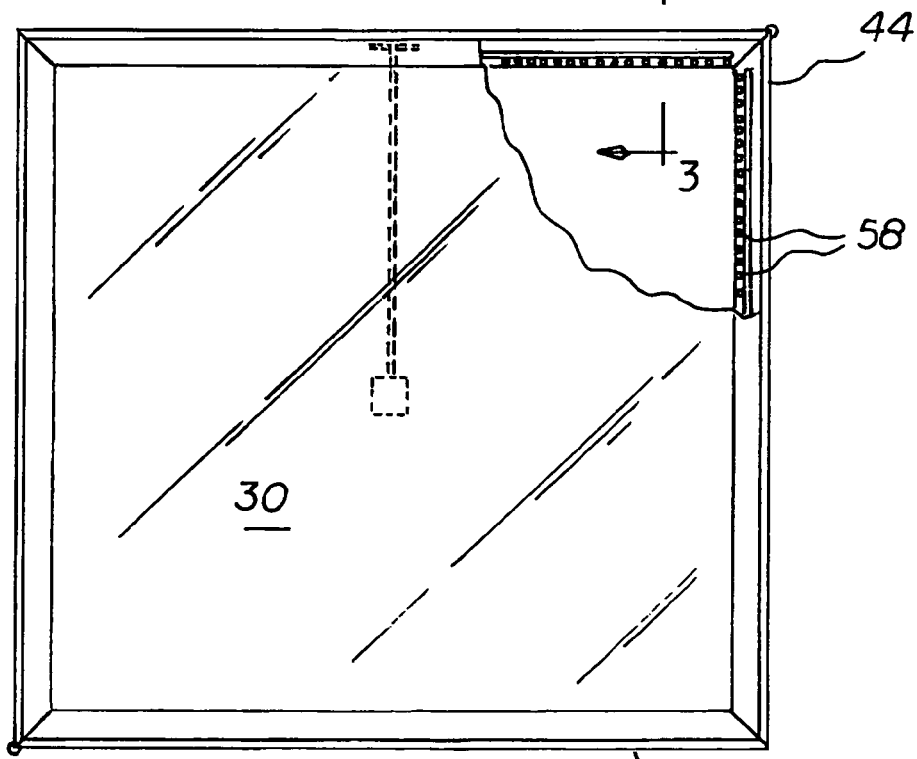

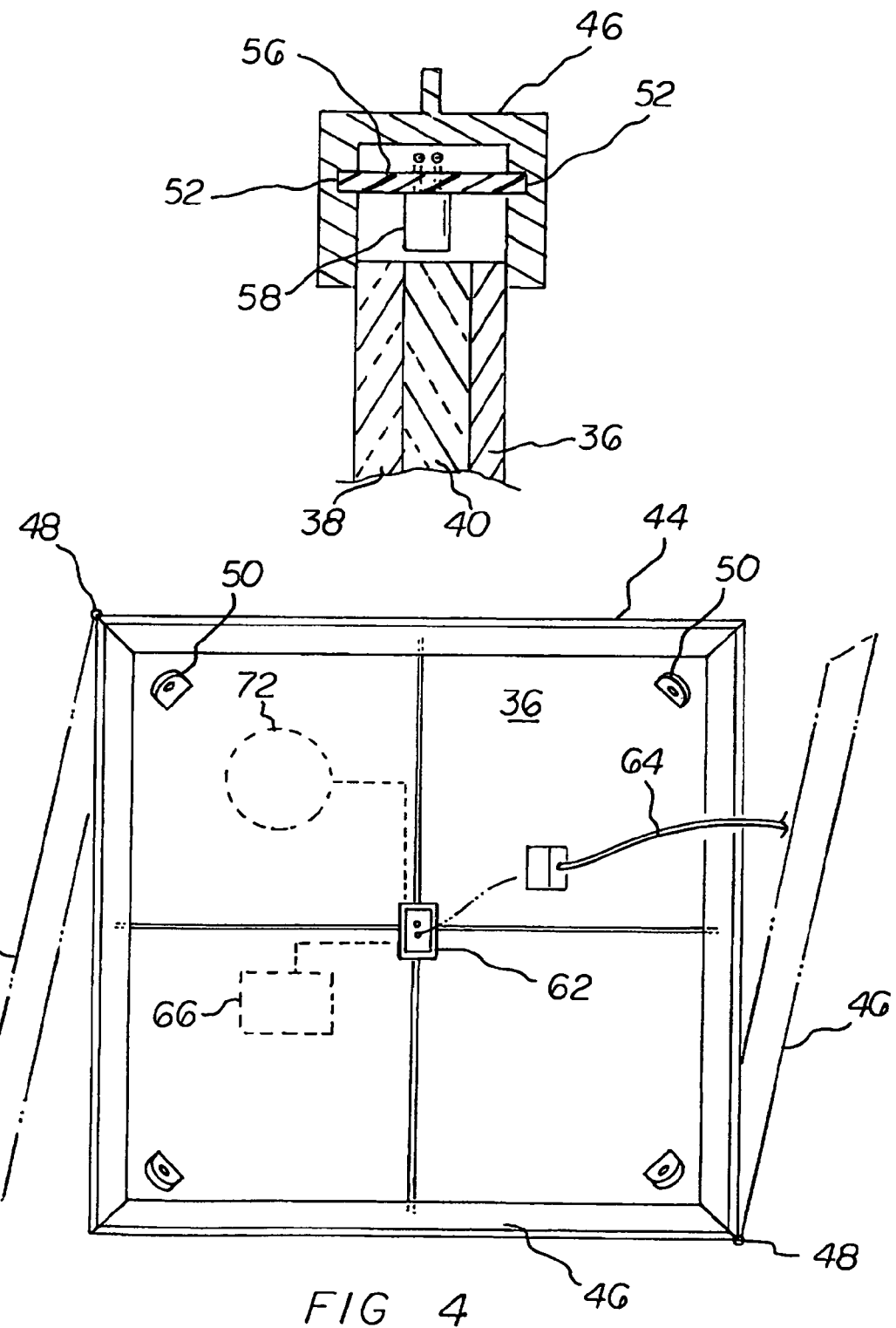

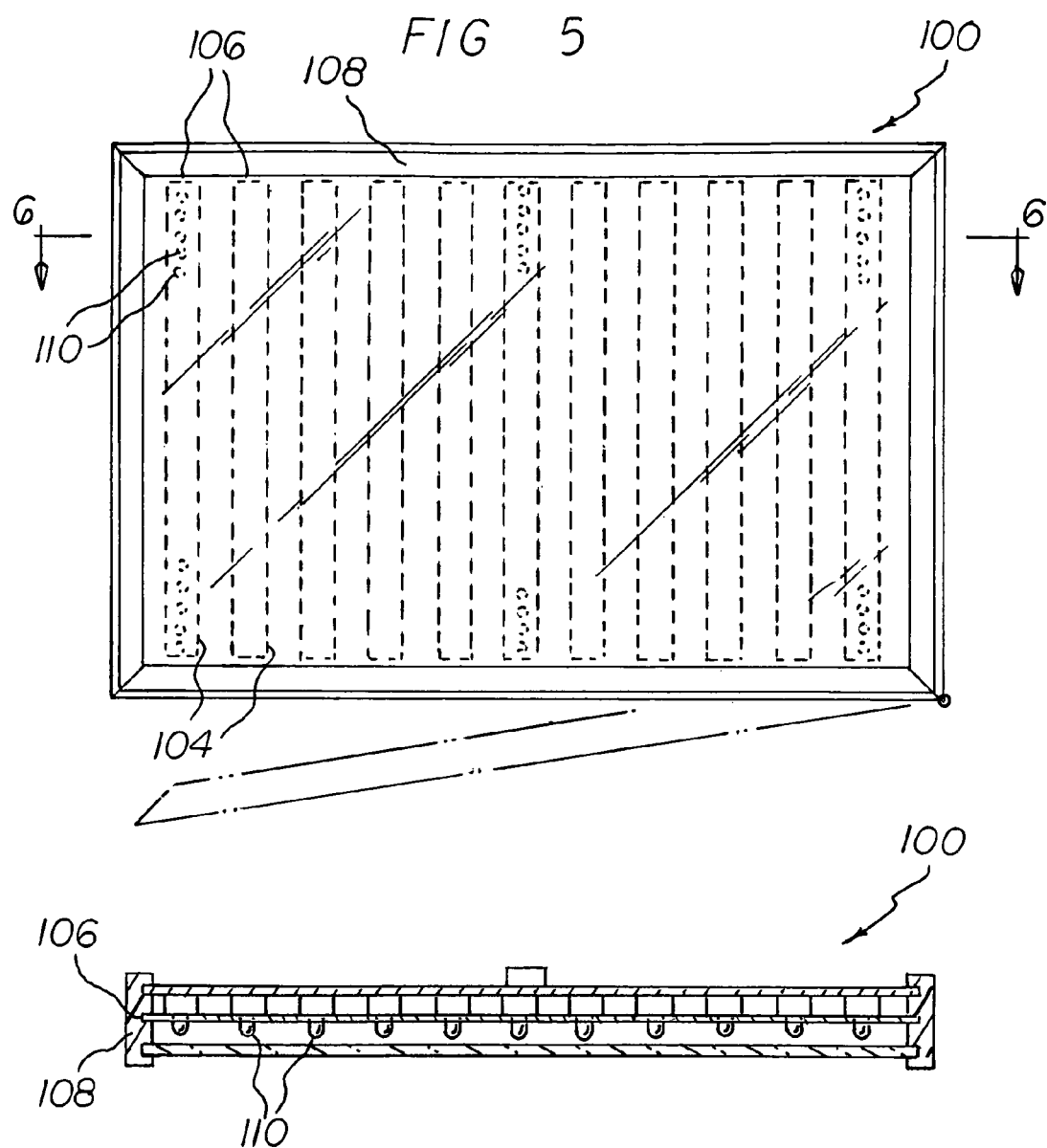

LIGHT EMITTING DIODE ILLUMINATION SYSTEM

BACKGROUND OF THE INVENTION

1. Field of the Invention

The present invention relates to a light emitting diode illumination system and more particularly pertains to utilizing flat thin panels to light up an area in a safe, compact, convenient and economical manner.

2. Description of the Prior Art

The use of illumination systems of known designs and configurations is known in the prior art. More specifically, illumination systems of known designs and configurations previously devised and utilized for the purpose of lighting up an area are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a light emitting diode illumination system that allows for utilizing flat thin panels to light up an area in a safe, compact, convenient and economical manner.

In this respect, the light emitting diode illumination system according to the present invention substantially departs from the conventional concepts and designs of the prior art, and in doing so provides an apparatus primarily developed for the purpose of utilizing flat thin panels to light up an area in a safe, compact, convenient and economical manner.

Therefore, it can be appreciated that there exists a continuing need for a new and improved light emitting diode illumination system which can be used for utilizing flat thin panels to light up an area in a safe, compact, convenient and economical manner. In this regard, the present invention substantially fulfills this need.

SUMMARY OF THE INVENTION

In view of the foregoing disadvantages inherent in the known types of illumination systems of known designs and configurations now present in the prior art, the present invention provides an improved light emitting diode illumination system. As such, the general purpose of the present invention, which will be described subsequently in greater detail, is to provide a new and improved light emitting diode illumination system and method which has all the advantages of the prior art and none of the disadvantages.

To attain this, the present invention essentially comprises a light emitting diode illumination system for utilizing flat thin panels to light up an area in a safe, compact, convenient and economical manner. First provided is an area to be lit up. The area includes a ceiling formed of a grid work of rectangular supports. Each support has a peripheral ledge.

Next provided is a plurality of rectangular ceiling panels. Each ceiling panel has a periphery resting upon some of the peripheral ledges.

A plurality of rectangular illumination panels is next provided. Each illumination panel has four peripheral edges resting upon some of the peripheral ledges remote from the ceiling panels.

Each of the illumination panels is constructed of an upper plate, a lower plate and an intermediate plate. The intermediate plate is between the upper and lower plates. Each of the plates has aligned edges and an upper and a lower surface. The lower surface of the upper plate is in facing contact with the upper surface of the intermediate plate. The upper surface of the lower plate is in facing contact with the lower surface of the intermediate plate. The upper plate is fabricated of an optically reflective material. The lower plate is fabricated of an optically diffusive material. The intermediate plate is fabricated of an optically transparent material, commonly known as a light guide panel. The optically transparent material may be glass or a polymer so long as the light guide properties are good.

Each of the illumination panels includes a peripheral frame formed of four edge pieces. Each of the edge pieces is in a C-shaped cross sectional configuration. The edge pieces receive and support the peripheral edges of the illumination panels. A pair of hinges separably coupling adjacent edge pieces is next provided for selectively providing access to the illumination panels for repair and reconstruction purposes. A plurality of hooks is provided extending upwardly from the upper plate to provide additional support for each illumination panel. A pair of opposed recesses facing each other in the edge pieces are provided.

Next provided is a printed circuit board in a strip-like configuration. The printed circuit board is supported in each edge piece by the recesses. Each circuit board has a plurality of light emitting diodes facing the aligned edges of the plates.

An electrical connector positioned on the upper surface of the upper plate is next provided. The electrical connector is adapted to disperse electrical power to the light emitting diodes. Electrical lines are provided. The electrical lines are adapted to couple the electrical connector to a source of electrical potential. In an alternate embodiment of the invention, the electrical lines are eliminated and a battery pack is utilized to power the light emitting diodes.

Lastly, a sensor is provided. The sensor is operatively positioned in proximity to the plurality of light emitting diodes. The sensor is adapted to determine the lumen output of the plurality of light emitting diodes and to provide notification to a user that repair is required if a below acceptable level of lumen output is determined.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved light emitting diode illumination system which has all of the advantages of the prior art illumination systems of known designs and configurations and none of the disadvantages.

It is another object of the present invention to provide a new and improved light emitting diode illumination system which may be easily and efficiently manufactured and marketed.

It is further object of the present invention to provide a new and improved light emitting diode illumination system which is of durable and reliable constructions.

An even further object of the present invention is to provide a new and improved light emitting diode illumination system which is susceptible of a low cost of manufacture with regard to both materials and labor, and which accordingly is then susceptible of low prices of sale to the consuming public, thereby making such light emitting diode illumination system economically available to the buying public.

Even still another object of the present invention is to provide a light emitting diode illumination system for utilizing flat thin panels to light up an area in a safe, compact, convenient and economical manner.

Lastly, it is an object of the present invention to provide a new and improved light emitting diode illumination system having an illumination panel with four peripheral edges constructed of an upper plate and a lower plate. Each of the plates has aligned peripheral edges and an upper and lower surface. The upper plate is fabricated of an optically reflective material. The lower plate is fabricated of an optically diffusive material. Each of the illumination panels includes a peripheral frame formed of four edge pieces. Each of the edge pieces is in a cross sectional configuration to receive and support the peripheral edges of the plates. A pair of opposed recesses face each other in the edge pieces. A printed circuit board with a plurality of light emitting diodes is supported in the edge pieces by the recesses. An electrical connector is adapted to disperse electrical power to the light emitting diodes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a light emitting diode illumination system constructed in accordance with the principles of the present invention.

FIG. 2 is a bottom view of one of the illumination panels taken along line 2-2 of FIG. 1 with parts broken away to show certain internal constructions.

FIG. 3 is a cross sectional view taken along line 3-3 of FIG. 2.

FIG. 4 is a plan view of one of the illumination panels shown in the prior Figures.

FIG. 5 is a bottom view of an illumination panel constructed in accordance with an alternate embodiment of the invention.

FIG. 6 is a cross sectional view taken along line 6-6 of FIG. 5.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved light emitting diode illumination system embodying the principles and concepts of the present invention and generally designated by the reference numeral 10 will be described.

The present invention, the light emitting diode illumination system 10 is comprised of a plurality of components. Such components in their broadest context include an illumination panel, a printed circuit board and an electrical connector. Such components are individually configured and correlated with respect to each other so as to attain the desired objective.

The light emitting diode illumination system 10 is for utilizing flat thin panels to light up an area in a safe, compact, convenient and economical manner. First provided is an area 14 to be lit up. The area includes a ceiling 16 formed of a grid work of rectangular supports 18. Each support has a peripheral ledge 20.

Next provided is a plurality of rectangular ceiling panels 24. Each ceiling panel has a periphery 26 resting upon some of the peripheral ledges.

A plurality of rectangular illumination panels 30 is next provided. Each illumination panel has four peripheral edges 32 resting upon some of the peripheral ledges remote from the ceiling panels.

Each of the illumination panels is constructed of an upper plate 36, a lower plate 38 and an intermediate plate 40. The intermediate plate is between the upper and lower plates. Each of the plates has aligned edges and an upper and a lower surface. The lower surface of the upper plate is in facing contact with the upper surface of the intermediate plate. The upper surface of the lower plate is in facing contact with the lower surface of the intermediate plate. The upper plate is fabricated of an optically reflective material. The lower plate is fabricated of an optically diffusive material. The intermediate plate is fabricated of an optically transparent material, commonly known as a light guide panel. The optically transparent material may be glass or a polymer so long as the light guide properties are good.

Each of the illumination panels includes a peripheral frame 44 formed of four edge pieces 46. Each of the edge pieces is in a C-shaped cross sectional configuration. The edge pieces receive and support the peripheral edges of the illumination panels. A pair of hinges 48 separably coupling adjacent edge pieces is next provided for selectively providing access to the illumination panels for repair and reconstruction purposes. A plurality of hooks 50 is provided extending upwardly from the upper plate to provide additional support for each illumination panel. A pair of opposed recesses 52 facing each other in the edge pieces are provided.

Next provided is a printed circuit board 56 in a strip-like configuration. The printed circuit board is supported in each edge piece by the recesses. Each circuit board has a plurality of light emitting diodes 58 facing the aligned edges of the plates.

An electrical connector 62 positioned on the upper surface of the upper plate is next provided. The electrical connector is adapted to disperse electrical power to the light emitting diodes. Electrical lines 64 are provided. The electrical lines are adapted to couple the electrical connector to a source of electrical potential. In an alternate embodiment of the invention, the electrical lines are eliminated and a battery pack 66 is utilized to power the light emitting diodes.

Lastly, a sensor 72 is provided. The sensor is operatively positioned in proximity to the plurality of light emitting diodes. The sensor is adapted to determine the lumen output, color, temperature or any other optical or physical characteristic of the plurality of light emitting diodes and to provide notification to a user that repair is required if a below acceptable level of lumen output is determined. A wide variety of other types of sensors could readily be utilized and other mounting approaches are possible including on the LED strips themselves a plurality of sensors may be provided.

An alternate embodiment of the system 100 of the invention is shown in FIGS. 5 and 6. In this embodiment, the printed circuit board includes a plurality of strips 104. The strips are in parallel relationship and are spaced from the next adjacent strip. The strips have ends 106 supported in the recesses of the edge pieces 108. The circuit board has the plurality of light emitting diodes 110 between the upper and lower plates and facing the lower plate.

The present invention is a light source in which one, multiple, or all sides are illuminated by LEDs, and these LEDs are sandwiched between a reflective material on one side, top or back side, and a diffusive material on the other side, bottom or front side. The purpose of sandwiching of reflective material and diffusive material is to guide the light in a direction perpendicular to the primary angle of LED emission such that the light is directed outward towards its intended space. This construction of a reflective/diffusive sandwich of side mounted LEDs are considered the "light source". This light source is then mounted within either a frame or a box for various applications/utilities. Furthermore, strips of LEDs used in the light source are made to be modular, enabling easy replacement without having to replace the entire fixture. An optional sensor mounted within the light source monitors the output light level of the LED modules and automatically triggers a warning or communication if the light level decreases to a configurable threshold. Optionally, the power supply for the fixture can be detachable.

Current approaches are limited in that today's typical lighting for commercial buildings is based on fluorescent technology, which requires a bulkier fixture. By contrast, the above-described construction enables a very thin profile light source, especially when the power supply for the light source is detached from the fixture. This allows for lighting to be installed in applications where the height between ceiling and the next floor, or the wall width for a fixture mounted in a wall, is limited. The present invention can be positioned as close as 1 inch to the sub-floor, in contrast to 8 inches to 12 inches for fluorescent fixtures. This modular LED light source also has the option of being connected to the power source solely by a low voltage line in, thus even further reducing the profile of the light. The fluorescent 'recessed' fixtures are bulky.

The modularity of the LED light source goes one step further. Fluorescent fixtures are constrained by standard bulb sizes, the smallest being 6 inches long and the longest being 4 feet long. The present invention's LED light source can be increased or reduced in increments of 1 inch, allowing for greater customized applications and maximum finished ceiling heights. In alternate embodiments, a wide variety of sizes and shapes may be utilized. The design dimensions may be customized.

Traditional LED lighting based approaches use direct LED illumination; however, in such an approach the LED's themselves are very visible and the lighting is not uniform. The construction of the present invention reduces or eliminates specular highlights of the LED sources such that the light viewed across the diffuser plane appears uniform or near uniform.

While traditional LED based lights typically last longer than both incandescent bulbs and fluorescent tubes, they do not last forever. Whereas incandescent bulbs "burn out", and fluorescent tubes "flicker" near end of life so that the time of replacement is obvious to the user. The LED's output typically "rolls off" gradually. For example, LED lifetime is typically specified in the US as the time until the LED output rolls off to 70 percent. However, the LED will still emit light well after that time. When output is only at 50 percent, possibly 7 years after installation, the user is getting less light than originally specified for the burden with worse efficacy, Lumens/Watt. This presents a problem for applications where a minimum level of brightness must be maintained over time such as factories or commercial buildings. Today's LED offerings have this inherent problem. The present invention, however, incorporates an optional sensor, a "life span sensor" which monitors light output and triggers a notification event once light output has been reduced beyond a configurable threshold. This notification event can drive any number of transducers, warning lights or control systems, such as DMX, to provide notification to users that LED modules should be replaced. Furthermore, because the present invention allows for the replacement of LEDs or strips of LEDs without having to replace or remove the lighting fixture, the output levels of overall lighting fixtures are maintained far beyond the lifetime limitations of the LED sources themselves, even in a flat light profile. The ability to ensure high levels of efficient light over a span of tens of years greatly improves the attractiveness of LEDs in general illumination applications.

By applying the fundamental principles of the present invention where the LED light source is sandwiched between reflector and diffuser planes to any frame and/or box enclosure the system may be used for a variety of light fixtures, such as, but not limited to, drop ceiling, surface mounted stairwell lighting, parking lot, residential and the back lighting of signage. Stairs and stair treads can also be illuminated using the low light model. Furthermore, the availability of the life span sensor will allow for placement in hard to reach or hard to light areas, because of restrictions, as the sensor will alert users of impending replacement needs before it becomes necessary and the light dies.

The light of the present invention is visually attractive to enhance the aesthetics and architectural style of a room.

An indirect LED version is possible. Side lit ultra bright LED's bounced into a coved reflective material then out through a diffuser material is another option.

One variation with regard to construction has to do with the power supply mounting. By separately mounting the power supply, the present invention achieves even slimmer light fixture profiles.

The components of the light source are: LED light sources, single or strips of LEDs; a reflective sheet for back of light source, typically metal sheet or metal sheet sprayed with reflective coating to enhance reflectivity; and a diffuser sheet for the front of the light source. A light guide panel may be used. As an alternative the diffuser sheet may be molded, laser cut or silkscreen.

Led strips will be manufactured in fixed lengths, e.g. 6 inches, 12 inches, 18 inches, 24 inches, and 36 inches. Each strip is treated as a light bulb in the sense that it plugs into a frame of the desired shape or length. Led strips are easily attached to a heat sink material/metal so as to make repairs or replacements quick. A detachable power supply unit is a standard feature on all lighting products. Universal Power supplies are 90 v-240 v 50/60 hz. Commercial buildings require 277 volts. RF filters are built-in on all power supplies to prevent any RF interference. AC power is supplied either by a hard-wire attachment or with a plug-in power cord.

Installed on each fixture is a light sensor, a life span sensor, that will sense the amount of light efficiency in each fixture. A control box is mounted remotely and can be set/programmed to notify user that the efficiency of the unit has now reached it's maximum performance and will now deteriorate in performance.

Additional features such as dimming, DMX can also be controlled by the above means. Linear dimming devices found in any construction can also control the lights of the present invention along with normal On/Off wall switches.

Extruded aluminum, or other metal, is used for the frame for drop ceiling use. A manufactured metal box with one side open is used for mounting of the light source for stairwell lighting, or other such uses. The power supply to drive the LEDs can be attached to the frame or detachable with low voltage wiring to LEDs.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A light emitting diode illumination system for utilizing flat thin panels to light up an area in a safe, compact, convenient and economical manner, the system comprising, in combination:

an area to be lit up, the area including a ceiling formed of a grid work of rectangular supports, each support having a peripheral ledge;

a plurality of rectangular ceiling panels, each ceiling panel having a periphery resting upon some of the peripheral ledges;

a plurality of rectangular illumination panels, each illumination panel having four peripheral edges resting upon some of the peripheral ledges remote from the ceiling panels;

each of the illumination panels being constructed of an upper plate, a lower plate and an intermediate plate between the upper and lower plates, each of the plates having aligned edges and an upper and a lower surface, the lower surface of the upper plate being in facing contact with the upper surface of the intermediate plate, the upper surface of the lower plate being in facing contact with the lower surface of the intermediate plate, the upper plate being fabricated of an optically reflective material, the lower plate being fabricated of an optically diffusive material, the intermediate plate being fabricated of an optically transparent material;

each of the illumination panels including a peripheral frame formed of four edge pieces, each of the edge pieces being in a C-shaped cross sectional configuration to receive and support the peripheral edges of the illumination panels, a pair of hinges separably coupling adjacent edge pieces for selectively providing access to the illumination panels for repair and reconstruction purposes, a plurality of hooks extending upwardly from the upper plate to provide additional support for each illumination panel, a pair of opposed recesses facing each other in the edge pieces;

a printed circuit board in a strip-like configuration supported in each edge piece by the recesses, each circuit board having a plurality of light emitting diodes facing the aligned edges of the plates;

an electrical connector positioned on the upper surface of the upper plate adapted to disperse electrical power to the light emitting diodes, and electrical lines adapted to couple the electrical connector to a source of electrical potential; and a sensor operatively positioned in proximity to the plurality of light emitting diodes adapted to determine the lumen output of the plurality of light emitting diodes and to provide notification to a user that repair is required if a below acceptable level of lumen output is determined.

* * * * *